(12) United States Patent
Imafuji et al.

(10) Patent No.: US 10,599,017 B2
(45) Date of Patent: Mar. 24, 2020

(54) INTERCHANGEABLE LENS, CAMERA BODY, AND ELECTRONIC DEVICE

(71) Applicant: NIKON CORPORATION, Tokyo (JP)

(72) Inventors: Kazuharu Imafuji, Kawasaki (JP); Masafumi Oikawa, Mitaka (JP)

(73) Assignee: NIKON CORPORATION, Tokyo (JP)

( * ) Notice: Subject to any disclaimer, the term of this patent is extended or adjusted under 35 U.S.C. 154(b) by 149 days.

(21) Appl. No.: 15/794,771

(22) Filed: Oct. 26, 2017

(65) Prior Publication Data

US 2018/0046066 A1 Feb. 15, 2018

Related U.S. Application Data

(63) Continuation of application No. 14/627,532, filed on Feb. 20, 2015, now Pat. No. 9,823,548, which is a
(Continued)

(30) Foreign Application Priority Data

Sep. 9, 2010 (JP) .................................. 2010-202104
Dec. 29, 2010 (JP) .................................. 2010-294513

(51) Int. Cl.
*G02B 7/02* (2006.01)
*G03B 17/14* (2006.01)
(Continued)

(52) U.S. Cl.
CPC .............. *G03B 17/14* (2013.01); *G02B 7/14* (2013.01); *G03B 17/565* (2013.01); *H04N 5/23209* (2013.01)

(58) Field of Classification Search
CPC ..................................................... G03B 17/14
(Continued)

(56) References Cited

U.S. PATENT DOCUMENTS 5,177,520 A 1/1993 Kohno et al.
5,382,994 A * 1/1995 Naito ..................... G03B 7/20
396/530

(Continued)

FOREIGN PATENT DOCUMENTS

JP H07-234432 9/1995
JP 2001-066489 A 3/2001

OTHER PUBLICATIONS

Oct. 26, 2016 Office Action Issued in U.S. Appl. No. 14/627,532.
Jul. 18, 2017 Notice of Allowance issued in U.S. Appl. No. 14/627,532.
Nov. 21, 2014 Notice of Allowance issued in U.S. Appl. No. 13/940,768.
Mar. 4, 2014 Office Action issued in U.S. Appl. No. 13/940,768.
Apr. 15, 2013 Notice of Allowance issued in U.S. Appl. No. 13/745,464.

(Continued)

*Primary Examiner* — James C. Jones
(74) *Attorney, Agent, or Firm* — Oliff PLC

(57) ABSTRACT

An interchangeable lens to be detachably attached to a camera body, that includes a holding unit at which a plurality of contacts is arranged, the interchangeable lens includes: a first communication contact system arranged at the holding unit; and a second communication contact system different from the first communication contact system, arranged at the holding unit at a position different from a position at which the first communication contact system is arranged. The fourth contact is arranged at a position closer to the second communication contact system than the first contact, the second contact, and the third contact are, and the seventh contact and the eighth contact are arranged at positions closer to the first communication contact system than the fifth contact and the sixth contact are.

26 Claims, 6 Drawing Sheets

Related U.S. Application Data continuation of application No. 13/940,768, filed on Jul. 12, 2013, now Pat. No. 8,995,069, which is a continuation of application No. 13/745,464, filed on Jan. 18, 2013, now abandoned, which is a continuation of application No. 13/033,166, filed on Feb. 23, 2011, now Pat. No. 8,400,722.

(60) Provisional application No. 61/425,506, filed on Dec. 21, 2010, provisional application No. 61/430,211, filed on Jan. 6, 2011.

(51) Int. Cl.
*H04N 5/232* (2006.01)
*G03B 17/56* (2006.01)
*G02B 7/14* (2006.01)

(58) Field of Classification Search
USPC ........................................................ 359/827
See application file for complete search history.

(56) References Cited

U.S. PATENT DOCUMENTS

| | | |
|---|---|---|
| 8,995,069 B2 | 3/2015 | Imafuji et al. |
| 2006/0216023 A1 | 9/2006 | Tokiwa et al. |
| 2007/0098385 A1 | 5/2007 | Tanaka et al. |
| 2009/0269049 A1 | 10/2009 | Ueda et al. |

OTHER PUBLICATIONS

Oct. 18, 2012 Notice of Allowance issued in U.S. Appl. No. 13/033,166.

Aug. 4, 2014 Notice of Allowance issued in U.S. Appl. No. 13/940,768.

May 8, 2018 Office Action issued in Indian Patent Application No. 486/DEL/2011.

\* cited by examiner

INTERCHANGEABLE LENS, CAMERA BODY, AND ELECTRONIC DEVICE

This is a Continuation of U.S. application Ser. No. 14/627,532 filed on Feb. 20, 2015 (now U.S. Pat. No. 9,823,548), which is a Continuation of U.S. application Ser. No. 13/940,768 filed on Jul. 12, 2013 (now U.S. Pat. No. 8,995,069), which is a Continuation of U.S. application Ser. No. 13/745,464 filed Jan. 18, 2013 (now abandoned), which is a Continuation of U.S. application Ser. No. 13/033,166 filed Feb. 23, 2011 (now U.S. Pat. No. 8,400,722), which claims the benefit of U.S. Provisional Application No. 61/425,506 filed Dec. 21, 2010, and U.S. Provisional Application No. 61/430,211 filed Jan. 6, 2011. This application also claims priority to Japanese Application No. 2010-202104 filed Sep. 9, 2010, and Japanese Patent Application No. 2010-294513 filed Dec. 29, 2010. The disclosure of each of the earlier applications is incorporated herein by reference in its entirety.

BACKGROUND OF THE INVENTION

1. Field of the Invention

The present invention relates to an interchangeable lens, a camera body and an electronic device.

2. Description of Related Art

There has been known a camera which electrically performs communication between the camera body and the interchangeable lens. Japanese Patent Laid-open Publication No. H07-234432 discloses an interchangeable lens that includes terminals for communicating with the camera body and terminals for communicating with an adapter such as an intermediate ring or rear focus converter. These two types of terminals constitute communication systems. When an adapter is attached, the interchangeable lens first communicates with the adapter via one of the communication systems. Then, the interchangeable lens communicates with the camera body via the other of the communication systems.

SUMMARY OF THE INVENTION

In the case of the camera body and interchangeable lens disclosed in the above publication, there is the possibility that when communication is performed by two independent communication systems simultaneously, the communication performed by one communication system could give an adverse effect on the communication performed by the other communication system.

An interchangeable lens to be detachably attached to a camera body, according to 1st aspect of the present invention, that includes a holding unit at which a plurality of contacts is arranged, the interchangeable lens comprises: a first communication contact system arranged at the holding unit, including a first contact through which a first clock signal output from the camera body is input, a second contact through which a first data signal output from the camera body in synchronization with the first clock signal is input, a third contact through which a second data signal is output to the camera body in synchronization with the first clock signal, and a fourth contact through which a first asynchronous signal that is asynchronous with the first clock signal is output to the camera body; and a second communication contact system different from the first communication contact system, arranged at the holding unit at a position different from a position at which the first communication contact system is arranged, the second communication contact system including a fifth contact through which a second clock signal is output to the camera body, a sixth contact through which a third data signal is output to the camera body in synchronization with the second clock signal, a seventh contact through which a second asynchronous signal that is asynchronous with the second clock signal is input from the camera body, and an eighth contact through which a third asynchronous signal that is asynchronous with the second clock signal is output to the camera body, wherein: the fourth contact is arranged at a position closer to the second communication contact system than the first contact, the second contact, and the third contact are, and the seventh contact and the eighth contact are arranged at positions closer to the first communication contact system than the fifth contact and the sixth contact are.

An interchangeable lens to be detachably attached to a camera body, according to a 2nd aspect of the present invention, that includes a holding unit at which a plurality of contacts is arranged, the interchangeable lens comprises: a first communication contact system arranged at the holding unit, including a first contact through which a first clock signal output from the camera body is input, a second contact through which a first data signal output from the camera body in synchronization with the first clock signal is input, a third contact through which a second data signal is output to the camera body in synchronization with the first clock signal, and a fourth contact through which a first asynchronous signal that is asynchronous with the first clock signal is output to the camera body; a second communication contact system different from the first communication contact system, arranged at the holding unit at a position different from a position at which the first communication contact system is arranged, the second communication contact system including a fifth contact through which a second clock signal is output to the camera body, a sixth contact through which a third data signal is output to the camera body in synchronization with the second clock signal, a seventh contact through which a second asynchronous signal that is asynchronous with the second clock signal is input from the camera body, and an eighth contact through which a third asynchronous signal that is asynchronous with the second clock signal is output to the camera body; a first communication device that receives the first data signal from the camera body using the second contact and transmits the second data signal to the camera body using the third contact based on the first asynchronous signal output from the fourth contact and the first clock signal input at the first contact; and a second communication device that transmits the third data signal to the camera body using the sixth contact based on the second asynchronous signal input at the seventh contact, the third asynchronous signal output from the eighth contact, and the second clock signal input at the fifth contact, wherein: the fourth contact is arranged at a position closer to the second communication contact system than the first contact, the second contact, and the third contact are, and the seventh contact and the eighth contact are arranged at positions closer to the first communication contact system than the fifth contact and the sixth contact are.

According to a 3rd aspect of the present invention the interchangeable lens according to the 1st aspect may further comprise: a driving device that drives a driven member; and a first power source contact system arranged at the holding unit at a position different from positions at which the first communication contact system and the second communication contact system are arranged, respectively, the first power source contact system including a ninth contact through which a drive voltage for driving the driving device is supplied from the camera body, and a tenth contact that is a ground germinal corresponding to the drive voltage, wherein the first power source contact system is arranged opposite to the first communication contact system with respect to the second communication contact system.

According to a 4th aspect of the present invention, in the interchangeable lens according to the 3rd aspect, in the first power source contact system, the tenth contact may be arranged closest to the second communication contact system.

According to a 5th aspect of the present invention, in the interchangeable lens according to the 4th aspect, in the second communication contact system, the sixth contact may be arranged closest to the tenth contact.

According to a 6th aspect of the present invention, the interchangeable lens according to the 5th aspect may further comprise: a second power source contact system arranged at the holding unit at a position different from positions at which the first communication contact system, the second communication contact system, and the first power source contact system are arranged, respectively, the second power source contact system including an eleventh contact through which an operation voltage having a different voltage value from the drive voltage is supplied from the camera body, and a twelfth contact that is a ground terminal corresponding to the operation voltage, wherein: a value of the operation voltage supplied to the eleventh contact is smaller than a value of the drive voltage supplied to the ninth contact; the first power source contact system is arranged opposite to the second communication contact system with respect to the first communication contact system; and the twelfth contact is arranged at a position closer to the first communication contact system than the eleventh contact is.

According to a 7th aspect of the present invention, in the interchangeable lens according to the 6th aspect, it is preferable that: the first contact is arranged opposite to the eleventh contact with respect to the twelfth contact; the third contact is arranged opposite to the second communication contact system with respect to the fourth contact; the second contact is arranged between the first contact and the third contact; the seventh contact is arranged opposite to the third contact with respect to the fourth contact; and the eighth contact is arranged opposite to the fourth contact with respect to the seventh contact.

According to a 8th aspect of the present invention, in the interchangeable lens according to the 6th aspect, the eleventh contact, the twelfth contact, the first contact, the second contact, the third contact, the fourth contact, the seventh contact, the eighth contact, the fifth contact, the sixth contact, the tenth contact, and the ninth contact may be arranged in that order at the holding unit in the form of a circular arc.

According to a 9th aspect of the present invention, in the interchangeable lens according to the 6th aspect, a difference between an upper limit and a lower limit of current that flows through the tenth contact may be greater than a difference between an upper limit and a lower limit of current that flows through the twelfth contact.

According to a 10th aspect of the present invention, the interchangeable lens according to the 2nd aspect may further comprise: a driving device that drives an optical member; a first power source contact system arranged at the holding unit at a position different from positions at which the first communication contact system and the second communication contact system are arranged, respectively, the first power source contact system including a ninth contact through which a drive voltage for driving the driving device is supplied from the camera body, and a tenth contact that is a ground terminal corresponding to the drive voltage; and a second power source contact system arranged at the holding unit at a position different from positions at which the first communication contact system, the second communication contact system, and the first power source contact system are arranged, respectively, the second power source contact system including an eleventh contact through which an operation voltage for the first communication device and the second communication device are supplied from the camera body, and a twelfth contact that is a ground terminal corresponding to the operation voltage, wherein: a value of the operation voltage supplied to the eleventh contact is smaller than a value of the drive voltage supplied to the ninth contact; the first power source contact system is arranged opposite to the second communication contact system with respect to the first communication contact system; the twelfth contact is arranged at a position closer to the first communication contact system than the eleventh contact is; the first contact is arranged opposite to the eleventh contact with respect to the twelfth contact; the third contact is arranged opposite to the second communication contact system with respect to the fourth contact; the second contact is arranged between the first contact and the third contact; the seventh contact is arranged opposite to the third contact with respect to the fourth contact; and the eighth contact is arranged opposite to the fourth contact with respect to the seventh contact.

According to a 11th aspect of the present invention, in interchangeable lens according to the 2nd aspect, one of the first communication device and the second communication device may be capable of performing communication with the camera body even when another of the first communication device and the second communication device performs communication with the camera body.

An interchangeable lens to be detachably attached to a camera body, according to a 12th aspect of the present invention, that includes a driven member, the interchangeable lens comprises: a first contact through which a first clock signal output from the camera body is input; a second contact through which a first data signal output from the camera body in synchronization with the first clock signal is input; a third contact through which a second data signal is output to the camera body in synchronization with the first clock signal; a fourth contact through which a first asynchronous signal that is asynchronous with the first clock signal is output to the camera body; a fifth contact through which a second clock signal is output to the camera body; a sixth contact through which a third data signal is output to the camera body in synchronization with the second clock signal; a seventh contact through which a second asynchronous signal that is asynchronous with the second clock signal is input from the camera body; an eighth contact through which a third asynchronous signal that is asynchronous with the second clock signal is output to the camera body; a ninth contact through which a drive voltage for driving the driven member is supplied from the camera body; a tenth contact that is a ground germinal corresponding to the drive voltage; an eleventh contact through which an operation voltage having a different voltage value from the drive voltage is supplied from the camera body; a twelfth contact that is a ground terminal corresponding to the operation voltage; and a holding unit at which the first to twelfth contacts are arranged, wherein: the eleventh contact is arranged on one end and the ninth contact is arranged on another end of the arrangement of the twelve contacts; the twelfth contact is arranged next to the eleventh contact in the arrangement of the twelve contacts; the first contact is arranged opposite to the eleventh contact with respect to the twelfth contact in the arrangement of the twelve contacts; the second contact is arranged opposite to the twelfth contact with respect to the first contact in the arrangement of the twelve contacts; the third contact is arranged opposite to the first contact with respect to the second contact in the arrangement of the twelve contacts; the fourth contact is arranged opposite to the third contact with respect to the second contact in the arrangement of the twelve contacts; the seventh contact is arranged opposite to the third contact with respect to the fourth contact in the arrangement of the twelve contacts; the eighth contact is arranged opposite to the fourth contact with respect to the seventh contact in the arrangement of the twelve contacts; the fifth contact is arranged opposite to the seventh contact with respect to the eighth contact in the arrangement of the twelve contacts; the sixth contact is arranged opposite to the fifth contact with respect to the eighth contact in the arrangement of the twelve contacts; and the tenth contact is arranged opposite to the fifth contact with respect to the sixth contact and next to the ninth contact in the arrangement of the twelve contacts.

According to a 13th aspect of the present invention, in the interchangeable lens according to the 12th aspect, a value of the drive voltage may be greater than a value of the operation voltage.

According to a 14th aspect of the present invention, in the interchangeable lens according to the 1st aspect, the driven member may include any of a member movable in a direction of optical axis of an optical system, a member movable in a direction perpendicular to the optical axis, and a member that is movable so as to change a size of an aperture through which a light flux passes.

A camera body, according to a 15th aspect of the present invention, which an interchangeable lens is to be detachably attached to and which includes a holding unit at which a plurality of contacts is arranged, the camera body comprises: a first communication contact system arranged at the holding unit, including a first contact through which a first clock signal is output to the interchangeable lens, a second contact through which a first data signal is output to the interchangeable lens in synchronization with the first clock signal, a third contact through which a second data signal is input from the interchangeable lens in synchronization with the first clock signal, and a fourth contact through which a first asynchronous signal that is asynchronous with the first clock signal is input from the interchangeable lens; and a second communication contact system different from the first communication contact system, arranged at the holding unit at a position different from a position at which the first communication contact system is arranged, the second communication contact system including a fifth contact through which a second clock signal is output to the interchangeable lens, a sixth contact through which a third data signal is input from the interchangeable lens in synchronization with the second clock signal, a seventh contact through which a second asynchronous signal that is asynchronous with the second clock signal is output to the interchangeable lens, and an eighth contact through which a third asynchronous signal that is asynchronous with the second clock signal is input from the interchangeable lens, wherein: the fourth contact is arranged at a position closer to the second communication contact system than the first contact, the second contact, and the third contact are; and the seventh contact and the eighth contact are arranged at positions closer to the first communication contact system than the fifth contact and the sixth contact are.

A camera body, according to a 16th aspect of the present invention, which an interchangeable lens is to be detachably attached to and which includes a holding unit at which a plurality of contacts is arranged, the camera body comprises: a first communication contact system arranged at the holding unit, including a first contact through which a first clock signal is output to the interchangeable lens, a second contact through which a first data signal is output to the interchangeable lens in synchronization with the first clock signal, a third contact through which a second data signal is input from the interchangeable lens in synchronization with the first clock signal, and a fourth contact through which a first asynchronous signal that is asynchronous with the first clock signal is input from the interchangeable lens; a second communication contact system different from the first communication contact system, arranged at the holding unit at a position different from a position at which the first communication contact system is arranged, the second communication contact system including a fifth contact through which a second clock signal is output to the interchangeable lens, a sixth contact through which a third data signal is input from the interchangeable lens in synchronization with the second clock signal, a seventh contact through which a second asynchronous signal that is asynchronous with the second clock signal is output to the interchangeable lens, and an eighth contact through which a third asynchronous signal that is asynchronous with the second clock signal is input from the interchangeable lens; a first communication device that transmits the first data signal to the interchangeable lens using the second contact and receives the second data signal from the interchangeable lens using the third contact based on the first asynchronous signal input at the fourth contact and the first clock signal output from the first contact; and a second communication device that receives the third data signal from the interchangeable lens using the sixth contact based on the second asynchronous signal output from the seventh contact, the third asynchronous signal input at the eighth contact, and the second clock signal output from the fifth contact, wherein: the fourth contact is arranged at a position closer to the second communication contact system than the first contact, the second contact, and the third contact are; and the seventh contact and the eighth contact are arranged at positions closer to the first communication contact system than the fifth contact and the sixth contact are.

According to a 17th aspect of the present invention, the camera body according to the 15th aspect may further comprise: a first power source contact system arranged at the holding unit at a position different from positions at which the first communication contact system and the second communication contact system are arranged, respectively, the first power source contact system including a ninth contact through which a drive voltage for driving a driven member of the interchangeable lens is supplied, and a tenth contact that is a ground terminal corresponding to the drive voltage, wherein: the first power source contact system is arranged opposite to the first communication contact system with respect to the second communication contact system.

According to a 18th aspect of the present invention, in the camera body according to the 17th aspect, in the first power source contact system, the tenth contact may be arranged closest to the second communication contact system.

According to a 19th aspect of the present invention, in the camera body according to the 18th aspect, in the second power source contact system, the sixth contact may be arranged closest to the tenth contact.

According to a 20th aspect of the present invention, the camera body according to the 19th aspect may further comprise: a second power source contact system arranged at the holding unit at a position different from positions at which the first communication contact system, the second communication contact system, and the first power source contact system are arranged, respectively, the second power source contact system including an eleventh contact through which an operation voltage having a different voltage value from the drive voltage is supplied to the interchangeable lens, and a twelfth contact that is a ground terminal corresponding to the operation voltage, wherein: a value of the operation voltage supplied to the eleventh contact is smaller than a value of the drive voltage supplied to the ninth contact; the first power source contact system is arranged opposite to the second communication contact system with respect to the first communication contact system; and the twelfth contact is arranged at a position closer to the first communication contact system than the eleventh contact is.

According to a 21st aspect of the present invention, in the camera body according to the 20th aspect, it is preferable that: the first contact is arranged opposite to the eleventh contact with respect to the twelfth contact; the third contact is arranged opposite to the second communication contact system with respect to the fourth contact; the second contact is arranged between the first contact and the third contact; the seventh contact is arranged opposite to the third contact with respect to the fourth contact; and the eighth contact is arranged opposite to fourth contact with respect to the seventh contact.

A camera body, according to a 22nd aspect of the present invention, which an interchangeable lens including a driven member is to be detachably attached, the interchangeable lens comprises: a first contact that outputs a first clock signal to the interchangeable lens; a second contact outputs a first data signal to the interchangeable lens in synchronization with the first clock signal; a third contact that inputs a second data signal from the interchangeable lens in synchronization with the first clock signal; a fourth contact that inputs a first asynchronous signal that is asynchronous with the first clock signal from the interchangeable lens; a fifth contact that outputs a second clock signal; a sixth contact that inputs a third data signal from the interchangeable lens in synchronization with the second clock signal; a seventh contact that outputs a second asynchronous signal that is asynchronous with the second clock signal to the interchangeable lens; an eighth contact that inputs a third asynchronous signal that is asynchronous with the second clock signal from the interchangeable lens; a ninth contact that supplies a drive voltage for driving the driven member of the interchangeable lens; a tenth contact that is a ground terminal corresponding to the drive voltage; an eleventh contact that supplies an operation voltage having a value different from a value of the drive voltage to the interchangeable lens; a twelfth contact that is a ground terminal corresponding to the operation voltage; and a holding unit at which the first to twelfth contacts are arranged, wherein: the eleventh contact is arranged on one end and the ninth contact is arranged on another end of the arrangement of the twelve contacts; the twelfth contact is arranged next to the eleventh contact in the arrangement of the twelve contacts; the first contact is arranged opposite to the eleventh contact with respect to the twelfth contact in the arrangement of the twelve contacts; the second contact is arranged opposite to the twelfth contact with respect to the first contact in the arrangement of the twelve contacts; the third contact is arranged opposite to the first contact with respect to the second contact in the arrangement of the twelve contacts; the fourth contact is arranged opposite to the third contact with respect to the second contact in the arrangement of the twelve contacts; the seventh contact is arranged opposite to the third contact with respect to the fourth contact in the arrangement of the twelve contacts; the eighth contact is arranged opposite to the fourth contact with respect to the seventh contact in the arrangement of the twelve contacts; the fifth contact is arranged opposite to the seventh contact with respect to the eighth contact in the arrangement of the twelve contacts; the sixth contact is arranged opposite to the fifth contact with respect to the eighth contact in the arrangement of the twelve contacts; and the tenth contact is arranged opposite to the fifth contact with respect to the sixth contact and next to the ninth contact in the arrangement of the twelve contacts.

An electronic device, according to a 23rd aspect of the present invention, which an interchangeable lens including a driven member is to be detachably attached, the electronic device comprises: a first contact that outputs a first clock signal to the interchangeable lens; a second contact outputs a first data signal to the interchangeable lens in synchronization with the first clock signal; a third contact that inputs a second data signal from the interchangeable lens in synchronization with the first clock signal; a fourth contact that inputs a first asynchronous signal that is asynchronous with the first clock signal from the interchangeable lens; a fifth contact that outputs a second clock signal; a sixth contact that inputs a third data signal from the interchangeable lens in synchronization with the second clock signal; a seventh contact that outputs a second asynchronous signal that is asynchronous with the second clock signal to the interchangeable lens; an eighth contact that inputs a third asynchronous signal that is asynchronous with the second clock signal from the interchangeable lens; a ninth contact that supplies a drive voltage for driving the driven member of the interchangeable lens; a tenth contact that is a ground terminal corresponding to the drive voltage; an eleventh contact that supplies an operation voltage having a value different from a value of the drive voltage to the interchangeable lens; a twelfth contact that is a ground terminal corresponding to the operation voltage; and a holding unit at which the first to twelfth contacts are arranged, wherein: the eleventh contact is arranged on one end and the ninth contact is arranged on another end of the arrangement of the twelve contacts; the twelfth contact is arranged next to the eleventh contact in the arrangement of the twelve contacts; the first contact is arranged opposite to the eleventh contact with respect to the twelfth contact in the arrangement of the twelve contacts; the second contact is arranged opposite to the twelfth contact with respect to the first contact in the arrangement of the twelve contacts; the third contact is arranged opposite to the first contact with respect to the second contact in the arrangement of the twelve contacts; the fourth contact is arranged opposite to the third contact with respect to the second contact in the arrangement of the twelve contacts; the seventh contact is arranged opposite to the third contact with respect to the fourth contact in the arrangement of the twelve contacts; the eighth contact is arranged opposite to the fourth contact with respect to the seventh contact in the arrangement of the twelve contacts; the fifth contact is arranged opposite to the seventh contact with respect to the eighth contact in the arrangement of the twelve contacts; the sixth contact is arranged opposite to the fifth contact with respect to the eighth contact in the arrangement of the twelve contacts; and the tenth contact is arranged opposite to the fifth contact with respect to the sixth contact and next to the ninth contact in the arrangement of the twelve contacts.

DETAILED DESCRIPTION OF THE INVENTION

First Embodiment

Figure 1:
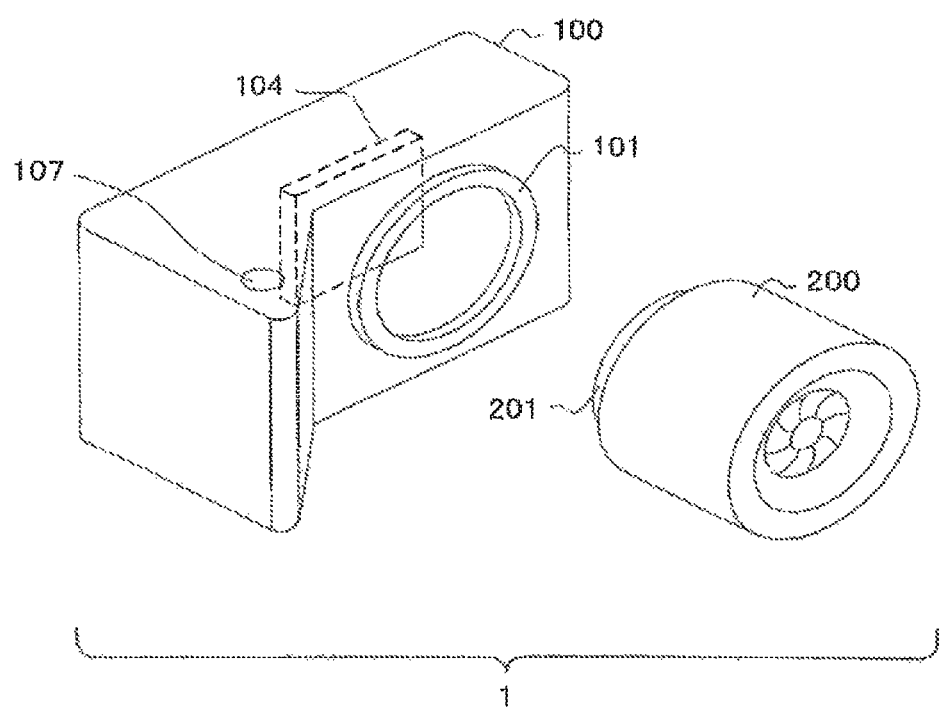
FIG. 1 presents a perspective view showing a camera system with interchangeable lenses according to the present invention.

FIG. 1 presents a perspective view showing a camera system with interchangeable lenses according to the present invention. In FIG. 1, only equipment and devices that relate to the present invention are shown but illustration and explanation on other equipment and devices are omitted. A camera 1 includes a camera body 100 and an interchangeable lens 200 that is detachably attached to the camera body 100.

The camera body 100 is provided with a lens mount 101 which the interchangeable lens 200 can be detachably attached to. As shown in FIG. 4B, a holding unit that holds contacts (electrical connection part) 102 is provided at a position near the lens mount 101 (on an inner periphery side) of the camera body 100 such that the holding unit 102 partially projects on the inner periphery side of the lens mount 101. The holding unit 102 is provided with a plurality of contacts.

The interchangeable lens 200 is provided with a lens mount 201 corresponding to the lens mount 101 on the camera body side, to which the camera body 100 can be detachably attached. As shown in FIG. 4B, a holding unit 202 is provided at a position near the lens mount 201 (on an inner periphery side) of the interchangeable lens 200 such that the holding unit 202 partially projects on the inner periphery side of the lens mount 201. The holding unit is provided with a plurality of contacts.

When the interchangeable lens 200 is attached to the camera body 100, the holding unit 102 provided with a plurality of contacts (which will be described later in detail) is electrically and physically connected to the holding unit 202 provided with a plurality of contacts (which will be described later in detail). The holding units 102 and 202 are used for supplying power from the camera body 100 to the interchangeable lens 200 and for transmitting and receiving signals between the camera body 100 and the interchangeable lens 200.

At the back of the lens mount 101 in the camera body 100, there is provided an image sensor 104. Above the camera body 100, there is provided a button 107 that serves as an input device. The user may send instructions to the camera body for imaging and for setting imaging conditions.

Figure 2:
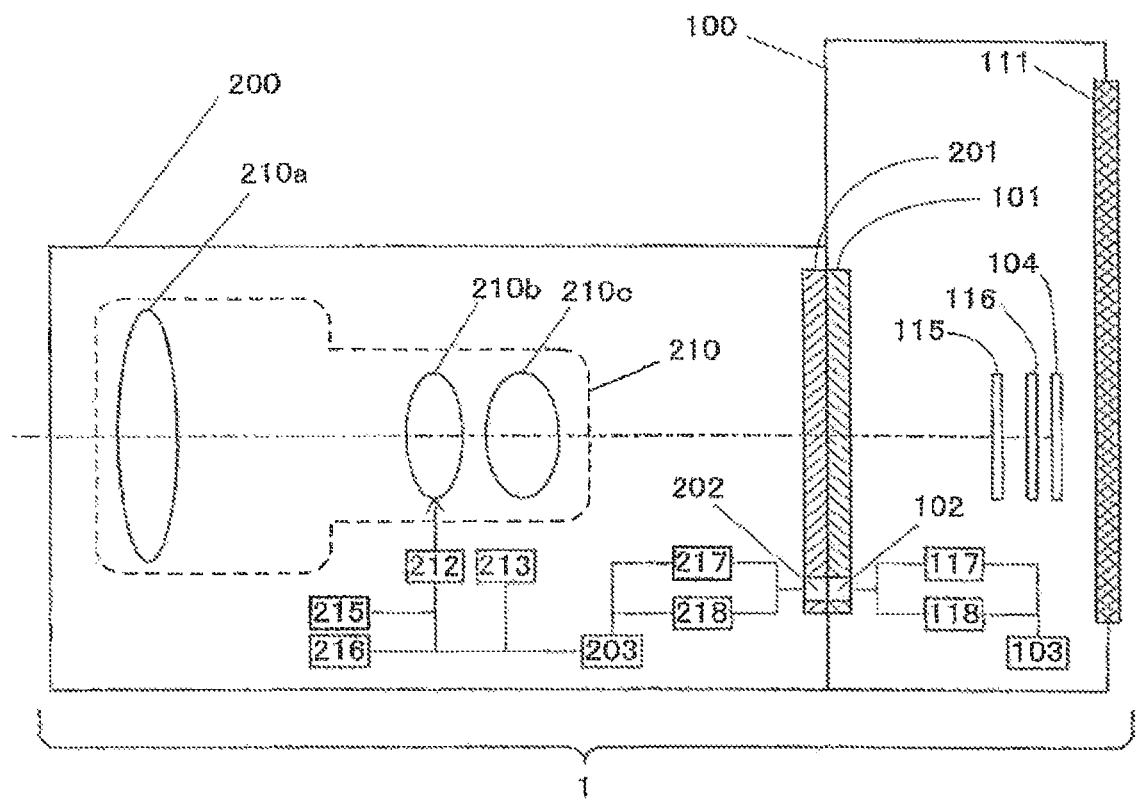
FIG. 2 presents a cross-sectional view showing a camera system with interchangeable lenses according to the present invention.

FIG. 2 presents a cross-sectional view showing a camera system with interchangeable lenses according to the present invention. The interchangeable lens 200 includes an imaging optical system 210 that forms an image of a subject. The imaging optical system 210 includes a plurality of lenses 210a to 210c. The plurality of lenses 210a to 210c includes a focusing lens 210b that controls a point of focus of a subject image.

Inside the interchangeable lens 200, there is provided a lens-side control unit 203 that controls each unit of the interchangeable lens 200. The lens-side control unit 203 includes a microcomputer (not shown) and its peripheral circuits (not shown). The lens-side control unit 203 is connected to a lens-side first communication unit 217, a lens-side second communication unit 218, a lens driving unit 212, a lens position-detecting unit 213, a ROM 215, and a RAM 216.

The lens-side first communication unit 217 and the lens-side second communication unit 218 transmit and receive data to and from the camera body 100 through the holding units 102, 202, respectively. The lens-side first communication unit 217 and the lens-side second communication unit 218 are lens-side communication interfaces, respectively. A lens CPU 203 performs communications (hot-line communication and command data communication) which will be described later between it and the camera body 100 (a body-side control unit 103 on the camera side, which will be described later) by using these communication interfaces, The lens driving unit 212 has an actuator such as a stepping motor and drives the focusing lens 210b in response to a signal that is input to the lens driving unit 212. A lens position-detecting unit 213 counts the number of pulses that are input to the stepping motor in the lens driving unit 212 and detects the position of the focusing lens 210b. Alternatively, the position of the focusing lens 210b may be detected by using a well-known distance encoder or the like provided in the interchangeable lens 200.

A driven member other than the focusing lens 210b may be provided in the interchangeable lens 200. For example, similarly to the focusing lens 210b, there may be provided, in the interchangeable lens 200, a zoom lens as a member that can move in the direction of an optical axis of the interchangeable lens (imaging optical system 210) and a mechanism that electrically drives the zoom lens (which is also referred to as "power zoom mechanism"). Also, there may be provided, in the interchangeable lens 200, an image blur correction mechanism including an image blur correction lens that can move in a moving direction containing components (X- and Y-direction components) perpendicular to the direction of the optical axis of the imaging optical system 210. The image blur correction mechanism drives the image blur correction lens to perform image blur correction. Furthermore, there may be provided, in the interchangeable lens 200, a power diaphragm mechanism that controls driving of diaphragm members (diaphragm blades), which are movable so that they can change the size of the aperture through which light flux from a subject passes. When such a driven member is provided, the lens-side control unit 203 controls the image blur correction lens, the diaphragm members, and the zoom lens for their driving and position detection by using the lens driving unit 212 and the lens position detecting unit 213.

The ROM 215 is a nonvolatile storage medium, in which a predetermined control program or the like to be executed by the lens-side control unit 203 is stored in advance.

The RAM 216 is a volatile storage medium, which is used as a storage area in which various data are stored by the lens-side control unit 203.

In front of the image sensor 104, there is provided a shutter 115 that controls an exposure state of the image sensor 104, and an optical filter 116 that is combined with an optical low pass filter or an infrared cut filter in combination. A subject light that has been transmitted through the imaging optical system 210 is input to the image sensor 104 through the shutter 115 and the filter 116.

Inside the camera body 100, there is provided a body-side control unit 103 that controls each unit of the camera body 100. The body-side control unit 103 includes a microcomputer (not shown), a RAM (not shown) and peripheral circuits therefor (not shown).

The body-side control unit 103 is connected to a body-side first communication unit 117 and a body-side second communication unit 118. The body-side first communication unit 117 is connected to the holding unit 102 and can transmit data to and receive data from the lens-side first communication unit 217. Similarly, the body-side second communication unit 118 can transmit data to and receive data from the lens-side second communication unit 218. In other words, the body-side first communication unit 117 and the body-side communication unit 118 are communication interfaces, respectively, on the body side. The body-side control 103 performs communications (hot-line communication and command data communication) which will be described later between it and the interchangeable lens 200 (lens-side control unit 203) by using these communication interfaces.

On the back side of the camera body 100, there is arranged a display unit 111 including an LCD panel or the like. The body-side control unit 103 an image of a subject based on the output from the image sensor 104 (so-called "through-image") and various menu screens for setting various conditions including conditions for imaging.

Explanation on Holding Units 102, 202

Figure 3:
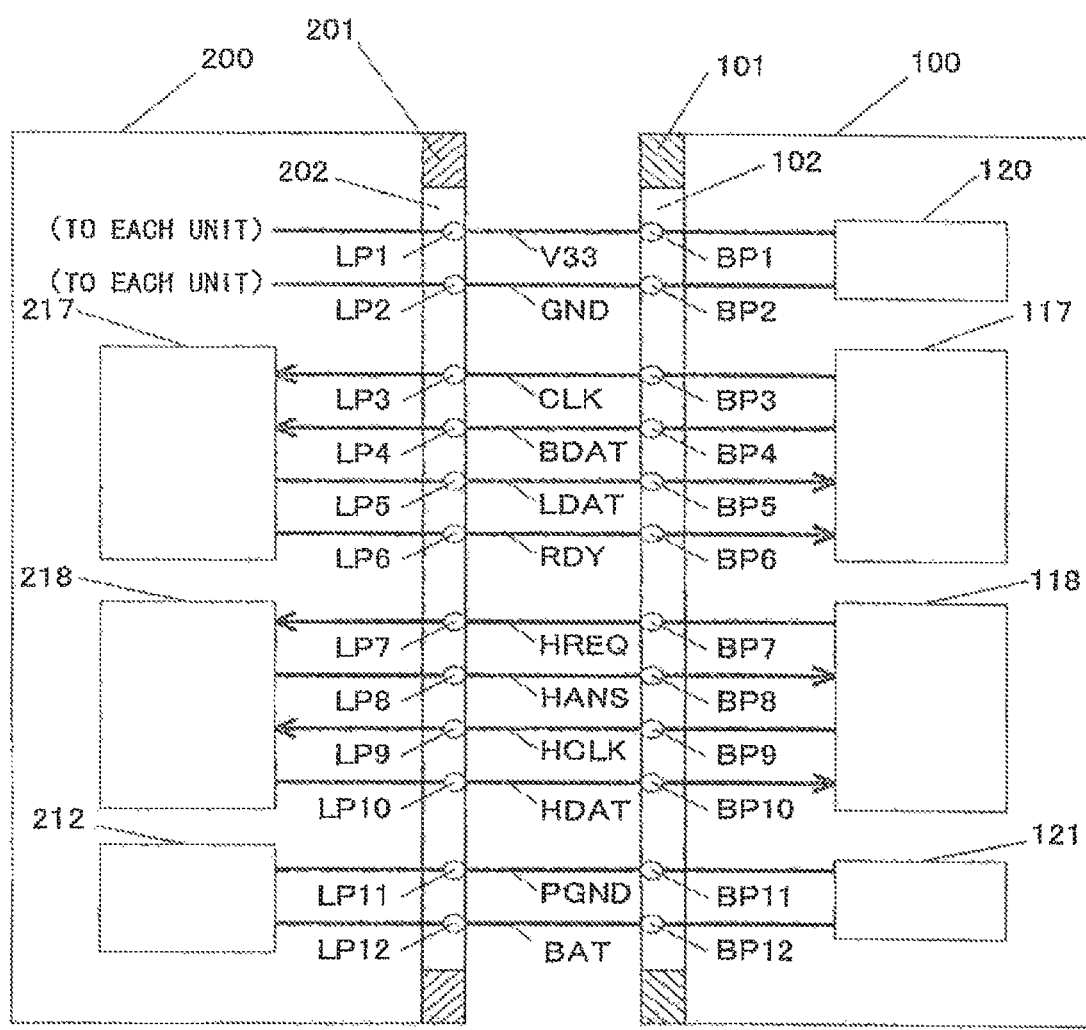
FIG. 3 presents a schematic diagram showing details of holding units.

FIG. 3 presents a schematic diagram showing details of the holding units 102, 202. FIG. 3 schematically illustrates the structure of the mount. As a result, the lens mount and the holding unit 102 of the camera body 100 are shown to be present on the same plane. However, in the actual structure of the mount, the holding unit 102 is set back far from a mount surface of the lens mount 101 of the camera body 100 (positioned on the right hand side with respect to the lens mount 101 in FIG. 3).

Also, FIG. 3 schematically illustrates the structure of the mount on the interchangeable lens side and the lens mount 201 of the interchangeable lens 200 and the holding unit 202 are shown to be present on the same plane. However, in actuality, the holding unit 202 is arranged at a position projected from the mount surface of the lens mount 101 (positioned on the right hand side with respect to the lens mount 201 in FIG. 3). As such, when the mount surface of the lens mount 101 and the mount surface of the lens mount 201 are brought in contact with each other to mount and connect the camera body 100 and the interchangeable lens 200, the holding unit 102 and the holding unit 202 are connected to each other and hence the electric contacts provided in the holding units also come to be connected to each other. Such a mount structure per se is well known and further explanation and illustration thereof is omitted here.

As shown in FIG. 3, twelve contacts BP1 to BP12 are present in the holding unit 102. Also, in the holding unit 202, there are twelve contacts LP1 to LP12 that correspond to BP1 to BP12, respectively.

The contacts BP1 and BP2 are connected to a first power circuit 120 in the camera body 100. The first power circuit 120 supplies to the contact BP1 operation voltage for each unit in the interchangeable lens 200 exclusive of the lens driving unit 212. That is, the contacts BP1 and LP1 supply operation voltage to each unit in the interchangeable lens 200 exclusive of the lens driving unit 212 (including a lens-side first communication unit 217 and a lens-side second communication unit 218). A value of voltage that can be supplied to the contact BP1 is within the range of a minimum voltage value and a maximum voltage value (for example, in a voltage width in the order of 3 V). However, the value of voltage that is normally supplied is near an intermediate value of the maximum and minimum voltage values. From this it follows that the current value of current that is supplied from the camera body 100 to the interchangeable lens 200 is about several tens milliamperes (mA) to several hundreds milliamperes (mA) when the power is ON.

The contact BP2 is a ground terminal corresponding to the operation voltage given to the contact BP1. That is, the contacts BP2 and LP2 are ground terminals corresponding to the operation voltage.

In the following explanation, a signal line via the contact BP1 and the contact LP1 is referred to as a signal line V33. A signal line via the contacts BP2 and LP2 is referred to as a signal line GND. The contacts LP1, LP2, BP1, and BP2 constitute a power source system contacts dedicated for supplying power from the camera body 100 side to the interchangeable lens 200 side.

The contacts BP3, BP4, BP5, and BP6 are connected to the body-side first communication unit 117. The contacts LP3, LP4, LP5, and LP6 on the interchangeable lens 200 side corresponding to the contacts BP3, BP4, BP5, and BP6, respectively, are connected to the lens-side first communication unit 217. The body-side first communication unit 117 and the lens-side first communication unit 217 transmit and receive data therebetween using these contacts (communication system contacts). The contents of communication performed between the body-side first communication unit 117 and the lens-side first communication unit 217 will be described in detail later.

In the following explanation, a signal line via the contacts BP3 and LP3 is referred to as a signal line CLK. Similarly, a signal line via the contacts BP4 and LP4 is referred to as a signal line BDAT, a signal ling via the contacts BP5 and LP5 is referred to as a signal line LDAT, and a signal line via the contacts BP6 and LP6 is referred to as a signal line RDY.

The contacts BP7, BP8, BP9, and BP10 are connected to the body-side second communication unit 118. The contacts LP7, LP8 LP9, and LP10 on the interchangeable lens 200 side corresponding to the contacts BP'7, BP8, BP9, and BP10, respectively, are connected to the lens-side second communication unit 218. The lens-side second communication unit 218 transmits data to and receives data from the body-side second communication unit 118 using these contacts (communication contacts). The contents of communication between the body-side second communication unit 118 and the lens-side second communication unit 218 will be described in detail later.

In the following explanation, a signal line via the contacts BP7 and LP7 is referred to as a signal line HREQ. Similarly, a signal line via the contacts BP8 and LP8 is referred to as a signal line HANS, a signal ling via the contacts BP9 and LP9 is referred to as a signal line HCLK, and a signal line via the contacts BP10 and LP10 is referred to as a signal line HDAT.

The contacts BP11 and BP12 are connected to a second power circuit 121 in the camera body 100. The second power circuit 121 also supplies to the contact BP12 driving voltage for driving the lens driving unit 212. That is, driving voltage for driving the driving unit 212 is supplied from the contacts BP12 and LP12. The second power circuit 121 supplies ground voltage corresponding to the operation voltage. That is, ground voltage corresponding to the driving voltage is supplied from the contacts BP11 and LP11. A value of voltage that can be supplied to the contact BP12 is within the range of a minimum voltage value and a maximum voltage value. The range of the voltage value for the contact BP12 is greater than the range of voltage value that can be supplied to the contact BP1 (for example, the maximum value of the voltage that can be supplied to the contact BP12 is on the order of several times the maximum value of the voltage that can be supplied to the contact BP1). That is, the value of the voltage supplied to the contact BP12 differs in magnitude from the value of the voltage supplied to the contact BP1. The value of the voltage normally supplied to the contact BP12 is near an intermediate value of the maximum and minimum voltage values. From this it follows that the current value of current that is supplied from the camera body 100 to the interchangeable lens 200 is about several tens milliamperes (mA) to several amperes (A) when the power is ON.

The contact BP11 is a ground terminal corresponding to the drive voltage given to the contact BP12. That is, the contacts BP11 and the contact LP11 are ground terminals corresponding to the drive voltage.

In the following explanation, a signal line via the contacts BP11 and LP11 is referred to as a signal line PGND. A signal line via the contacts BP12 and LP12 is referred to as a signal line BAT. The contacts LP11, LP12, BP11, and BP12 constitute power source system contacts dedicated for supplying power from the camera body 100 side to the interchangeable lens 200 side.

From the magnitude relation between the value of the voltage (value of current) supplied to the contact BP12 and the contact LP12 and the value of the voltage (value of current) supplied to the contact BP1 and the contact LP1, the following is apparent. That is, a difference between a maximum value and a minimum value of current that flows through the contacts BP11 and LP11 that serve as ground terminals for voltages supplied to the respective contacts is greater than a difference between a maximum value and a minimum value of current that flows through the contacts BP2 and LP2. This is due to the fact that the driving unit 212 having a driving system such as an actuator consumes more power than that consumed by an electronic circuit of the lens-side control unit 203 or the like in the interchangeable lens 200 and that when the focus lens 210b does not have to be driven, the lens driving unit 212 consumes no power.

Figure 4A:
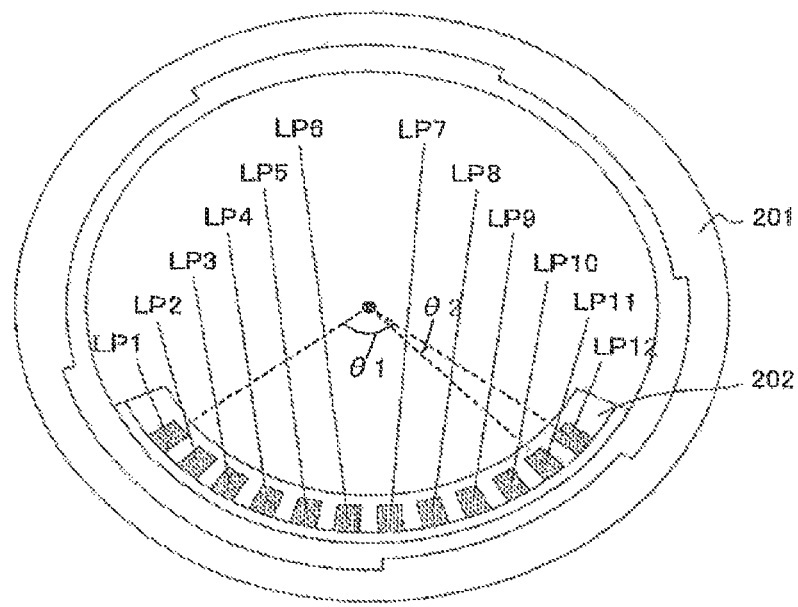
FIGS. 4A and 4B present front views showing lens mounts.
Figure 4B:
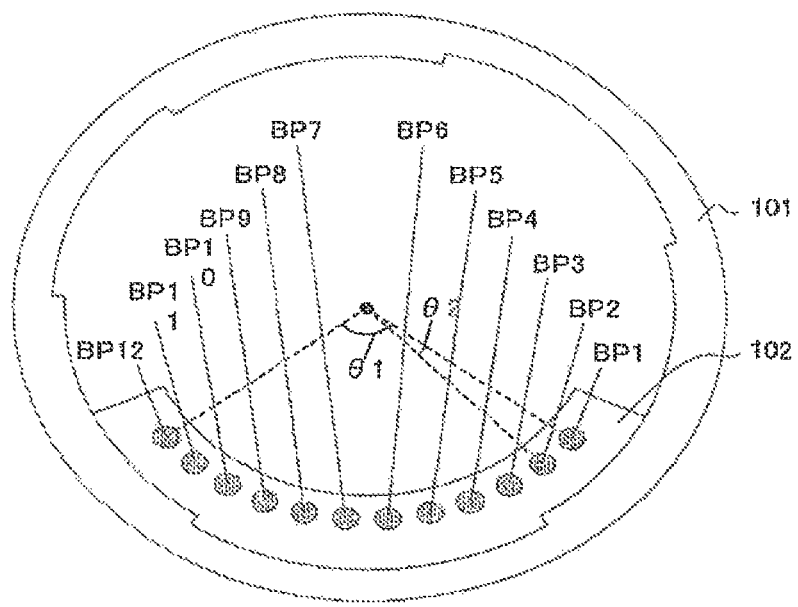

FIGS. 4A and 4B present front views showing the lens mounts 101 and 201, respectively. FIG. 4A prevents a diagram showing the lens mount 201 for the interchangeable lens 200 as seen from the camera body 100 side. FIG. 4B presents a diagram showing the lens mount 101 for the camera body 100 as seen from the interchangeable lens 200 side.

As shown in FIG. 4A, the contacts LP3, LP4, LP5, and LP6 are arranged in an orderly fashion in the form of a circular arc in the direction along the lens mount 201 (circumferential direction along a part of the lens mount having a substantially circular shape) in the holding unit 202. The contacts LP7, LP8, LP9, and LP10 are arranged in an orderly fashion in the form of a circular arc in a direction of extension of the direction in which the contacts LP3 to LP6 is arranged. Here, the contact LP6 is arranged at a position closer to the contacts LP7 to LP10 than to the contacts LP3 to LP5. The contacts LP7 and LP8 are arranged at respective positions closer to the contacts LP3 to LP6 than the contacts LP9 and LP10 are.

The contacts LP11 and LP12 are arranged in an orderly fashion in the form of a circular arc in a direction of extension of the direction in which the contacts LP3 to LP6 are arranged (circumferential direction). The contacts LP7 to LP10 are arranged between the contacts LP3 to LP6 and the contacts LP11 and LP12. The contact LP 10 is arranged next to the contact LP11.

The contacts LP1 and LP2 are arranged in an orderly fashion in the form of a circular arc in a direction of extension of the direction in which the contacts LP3 to LP6 are arranged (circumferential direction). The contacts LP3 to LP6 are arranged between the contacts LP7 to LP10 and the contacts LP1 and LP2. The contact LP2 is arranged at a position closer to the contacts LP3 to LP6 than the contact LP is.

That is, the twelve contacts LP1 to LP12 are arranged in an orderly fashion in the form of a circular arc. In the present embodiment, an angle of θ 1 of the circular arc (a sector formed by connecting the center of the mount, the center of the contact LP1 and the center of the contact LP12) is about 105 degrees. An angle of arc θ2 between any two adjacent contacts is about 9.5 degrees. In the present embodiment, the width in the circumferential direction of each of the twelve contacts is about 1.5 mm. The distance between the center of mount and the center of each contact (LP1 to LP12) is about 15 mm. Therefore, the distance between the centers of any adjacent two contacts in the circumferential direction is about 2.5 mm. Since the width of each contact in the circumferential direction is about 1 mm, the clearance between any two adjacent contacts in the circumferential direction is about 1 mm.

The width of each contact and the clearance between any two adjacent contacts may be changed appropriately if needed or desired. For example, the width of each contact in the circumferential direction may be increased or decreased by a unit of $\frac{1}{10}$ mm (by several tenths millimeters) and the clearance between any two adjacent contacts in the circumferential direction may be changed appropriately accordingly by a unit of $\frac{1}{10}$ mm (by several tenths millimeters, for example, ±0.2 mm).

The contact LP3 is arranged at a position adjacent to the contact LP2. The contact LP5 is next to the contact LP6. The contact LP4 is arranged between the contact LP3 and the contact LP5. The contact LP7 is arranged next to the contact LP6. The contact LP8 is arranged next to the contact LP9.

Focusing on the contacts that supply voltage from the camera body 100 to the interchangeable lens 200, the contacts are arranged as follows. The twelve contacts LP1 to LP12 are arranged in a circular arc in the holding unit 202. The contact LP12 is arranged at one end of the circular arrangement and the contact LP1 is arranged at the other end of the circular arrangement. The contact LP11 is arranged next to the contact LP12 and the contact LP2 is arranged next to the contact LP1. The contacts LP3 to LP6 are arranged next to the contact LP2 in the form of a circular arc. The contacts LP7 to LP10 are arranged next to the contact LP11 in the form of a circular arc.

That is, among the contacts arranged in a circular arc the contacts LP1, LP11 that supply source voltage are arranged on both ends thereof. The contacts LP2 and LP11, which are ground terminals corresponding to the source voltage, are arranged by one contact inner than the contacts LP1 and LP12. The other communication system contacts LP3 to LP10 are arranged between the two contacts LP2, LP11, which are ground terminals.

The construction in which the contacts LP3 to LP10, which are contacts for the communication system (communication system contacts), and the contacts LP1 and LP12, which are power source system contacts that supply the power source voltage (the above-mentioned operation voltage and driving voltage) are intervened by the contacts LP2 and LP11 which are ground terminals therefor, is adopted in order to minimize influences that the power source system contacts (signal line) would give on the communication system contacts (signal line).

The signal line (i.e., signal line that includes LP1 and LP12) that supplies source voltage yields a large change in voltage in response to a change in load in a supply destination to which the source voltage is supplied. The large change in voltage may give adverse influences on the communications signal line. According to the present embodiment, a measure is taken to suppress the adverse influence as follows. That is, the contacts for ground terminals (ground contacts LP2 and LP11), which are more stable with respect the change in voltage than the power source contacts (LP1 and LP12), are arranged as intervening between the communication system contacts LP3 to LP10 and the power source contacts LP1, LP12.

The contacts LP3 to LP6 connected to the lens-side first communication unit 217 and the contacts LP7 to LP10 connected to the lens-side second communication unit 218 are arranged next to each other. On the contrary, the contacts LP3, LP4, and LP5 of the lens-side first communication unit 217 and the contacts LP9, LP10 of the lens-side second communication unit 218 are arranged such that the contacts belonging to one communication unit (217 or 218) are not arranged next to the contacts belonging to different (the other) communication unit (218 or 217). That is, at positions near the contacts connected to the different (other) communication unit, the contacts LP6, LP7, and LP8 are arranged in lump. This is because the contacts LP6, LP7, and LP8 are designed to transmit signals that do not synchronize with a clock signal (i.e., signals that will change to a relatively less extent as compared with the clock signal or a signal synchronizing therewith, for example, signals whose state change per unit time is on the order of 1 kilo Hertz (kHz) to several kilo Hertz (kHz)). Generally, the clock signal or signal synchronizing therewith will change vigorously to such an extent that change per unit time is on the order of several mega Hertz (MHz) (for example, in the case where the clock signal is at 8 MHz and data signal synchronizing therewith is 4 MHz (though depending on the amount of data)), they tend to be a source of noises. Therefore, it is desirable that such a terminal be arranged remote from the contacts connected to the different (other) communication unit so that the influence on communication can be minimized. Accordingly, in the present embodiment, the following countermeasure is adopted. That is, the group of the contacts that transmit signals that do not synchronize with the clock signal (contacts LP6, LP7, LP8) are arranged so as to intervene between the group of the contacts that transmit clock signal or signals synchronizing therewith (contacts LP3, LP4, LP5) in the lens-side first communication unit 217 and the group of the contacts that transmit the clock signal or signals synchronizing therewith in the lens-side second communication unit 218 (contacts LP9, LP10).

The contacts LP7 to LP10 are arranged nearer the second power circuit 121 with respect to the contacts LP3 to LP6 whereas the contacts LP3 to LP6 are arranged nearer the first power circuit 120 with respect to the contacts LP7 to LP10. This is because the contacts LP7 to LP10 are less influenced by noises. The second power circuit 121 supplies power to the lens driving unit 212. The power consumption by the lens driving unit 212 changes considerably depending on whether or not the focusing lens 210b is driven. Therefore, the intensity of current that flows through the contact LP11 changes considerably, so that the influence on the contact belonging to the adjacent communication system is greater than that given by the contact LP2. However, as described later, communication using the contacts LP7 to LP10 is of a shorter period than communication using the contacts LP3 to LP6 (that is, the period in which the communication is performed using the contacts LP7 to LP10 is on the order of ⅟10 or less of the period of the communication performed using the contacts LP3 to LP6 and though described later, in the present embodiment, the communication performed using the contacts LP7 to LP10 is at a period of 16 msec whereas the communication performed using t e contacts LP3 to LP6 is at a period of 1 msec). As a result, even if the communication fails due to the influence of the contact LP11, the communication can be performed again immediately. In other words, the contacts LP7 to LP10 receive less influence by noises than the contacts LP3 to LP6 even when they are arranged next to the contact LP11.

The contact LP10 is arranged next to the contact LP11. This is because the contact LP10 is more resistant to noises than the contact LP9. As described later, the clock signal is transmitted through the contact LP9 and data signal that synchronize with the clock signal are transmitted through the contact LP10. The clock signal cannot be synchronized on the receiving side when the leading edge or falling edge thereof becomes vague due to influences by noises. On the other hand, the data signal is sampled with respect to signal level at the timing of leading edge or falling edge of the clock signal. Therefore, it is only necessary that the signal level is clear at the above-mentioned timing, so that the data signal has a higher resistance to noises than the clock signal.

The contacts BP1 to BP12 arranged in the holding unit 102 on the camera body 100 side shown in FIG. 4B are the same as the above-mentioned contacts LP1 to LP12 on the interchangeable lens 200 side. Accordingly, explanation thereof is omitted. As will be apparent from FIGS. 1, 4A and 4B, the mount 101 on the camera body side is configured such that it can be engaged with the mount 201 on the interchangeable lens side by first facing the both mounts 101 and 201 each other and then rotating one with respect to the other. Therefore, the order in which the contacts BP1 to BP12 are arranged in the circumferential direction is in reverse to the order in which the contacts LP1 to LP12 are arranged in the circumferential direction as shown in FIGS. 4A and 4B. That is, in FIGS. 4A and 4B, the contact LP1 is at the leftmost position and the contact LP12 is at the rightmost position whereas the contact BP1 is at the rightmost position and the contact BP12 is at the leftmost position.

Explanation on Command Data

The lens-side control unit 203 controls the lens-side first communication unit 217 to receive control data from the body-side first communication unit 117 and transmit response data to the body-side first communication unit 117 through the contacts LP3 to LP6, i.e., the signal lines CLK, BDAT, LDAT, and RDY concurrently in a first predetermined period (16 msec in the present embodiment). Hereafter, details of the communication performed between the lens-side first communication unit 217 and the body-side first communication unit 117 is explained.

In the present embodiment, the communication performed between the lens-side control unit 203 and the lens-side first communication unit 217 and the body-side control unit 103 and the body-side first communication unit 117 is referred to as "command data communication".

Figure 5:
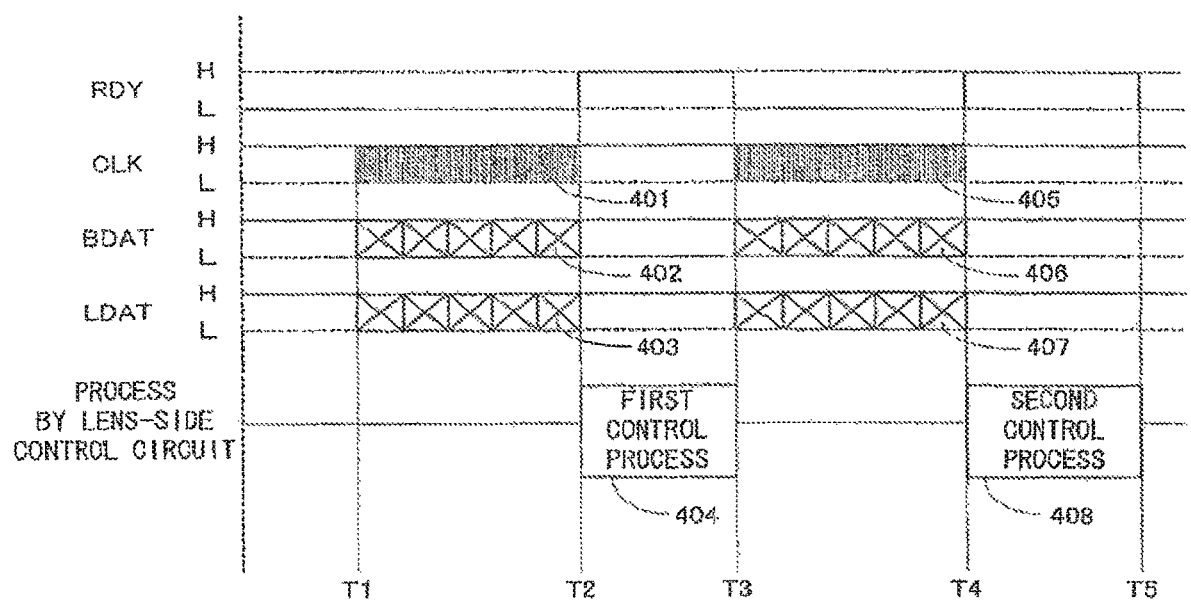
FIG. 5 presents a timing chart illustrating an example of command data communication.

FIG. 5 presents a timing chart illustrating an example of command data communication. The body-side control unit 103 and the body-side first communication unit 117 first check a signal level of the signal line RDY. The signal level of the signal line RDY indicates whether or not the communication of the lens-side first communication unit 217 is possible. The lens-side control unit 203 and the lens-side first communication unit 217 output a signal at a high (H) level through the contact LP6 when communication is impossible. That is, the level of the signal line is set to an H level. When the signal line RDY is at an H level, the body-side control unit 203 and the body-side first communication unit 117 will not start communication until the signal line RDY becomes at an L (low) level. During communication, the following processes are not performed.

When the signal line RDY is at the L (low) level, the body-side control unit 103 and the body-side first communication unit 117 output a clock signal 401 through the contact BP3. That is, the body-side control unit 103 and the body-side first communication unit 117 transmit the clock signal 401 to the lens-side first communication unit 217 via the signal line CLK. The body-side control unit 103 and the body-side first communication unit 117 outputs a body-side command packet signal 402, which is a front half of the control data through the contact BP4 in synchronization with the clock signal 401. That is, the body-side control unit 103 and the body-side first communication unit 117 transmit the body-side command packet signal 402 to the lens-side first communication unit 217 via the signal line BDAT.

When the clock signal 401 is output in the signal line CLK, the lens-side control unit 203 and the lens-side first communication unit 217 output a lens-side command packet signal 403, which is a front half of the response data, through the contact LP5 in synchronization with the clock signal 401. That is, the lens-side control unit 203 and the lens-side first communication unit 217 transmit the lens-side command packet signal 403 to the body-side first communication unit 117 via the signal line LDAT.

The lens-side control unit 203 and the lens-side first communication unit 217 set the signal level of the signal line RDY to an H level in response to completion of transmission of the lens-side command packet signal 403 (T2). The lens-side control unit 203 starts a first control process 404 (which will be described later).

When the first control process 404 is completed, the lens-side control unit 203 gives a notice of completion of the first control process 404 to the lens-side first communication unit 217. In response to this notice, the lens-side first communication unit 217 outputs a signal at an L level through the contact LP6. That is, the lens-side first communication unit 217 sets the signal level of the signal line RDY to an L level (T3). The body-side control unit 103 and the body-side first communication unit 117 outputs a clock signal 405 through the contact BP3 in response to this change in the signal level. That is, the body-side control unit 103 and the body-side first communication unit 117 transmit the clock signal 405 to the lens-side first communication unit 217 via the signal line CLK.

The body-side control unit 103 and the body-side first communication unit 117 output, through the contact BP4, a body-side data packet signal 406, which is a rear half of the control data, in synchronization with the clock signal 405. That is, the body-side control unit 103 and the body-side first communication unit 117 transmit a body-side data packet signal 406 to the lens-side first communication unit 217 via the signal line BDAT.

When the clock signal 405 is output in the signal line CLK, the lens-side control unit 203 and the lens-side first communication unit 217 output a lens-side data packet signal 407, which is a rear half of the response data, through the contact LP5 in synchronization with the clock signal 405. That is, the lens-side control unit 203 and the lens-side first communication unit 217 transmit the lens-side data packet signal 407 to the body-side first communication unit 117 via the signal line LDAT.

The lens-side control unit 203 and the lens-side first communication unit 217 again sets the signal level of the signal line RDY to an H level in response to completion of transmission of the lens-side data packet signal 407 (T4). The lens-side control unit 203 starts a second control process 408 (which will be described later).

The first control process 404 and the second control process 408 performed by the lens-side control unit 203 are described hereafter.

For example, a case where the received body-side command packet signal 402 is to request specified data from the interchangeable lens is described. The lens-side control unit 203 performs, as the first control process 404, an analysis process for analyzing the content of the command packet signal 402 and a process for generating the requested specified data. Further, the lens-side control unit 203 performs, as the first control process 404, communication error check process in which whether an error has occurred in the communication of the command packet signal 402 is easily checked by based on the number of bytes of data by using check sum data contained in the command packet signal 402. The signal of the specified data generated by the first control process 404 is output to the camera body as a lens-side data packet signal 407. In this case, a body-side data packet signal 406, which is output from the camera body after the command packet signal 402 has been output, is a dummy data signal (containing check sum data) which is meaningless to the interchangeable lens. In this case, the lens-side control unit 203 performs the above-mentioned communication error check process using the check sum data contained in the body-side data packet signal 406 as the second control process 408.

For example, a case where the received body-side command packet signal 402 is, an instruction to drive a driven member in the lens is described. For example, a case where the command packet signal 402 is an instruction to drive the focus lens 210b and the received body-side data packet signal 406 indicates an amount of drive of the focus lens 210b is described. The lens-side control unit 203 performs, as the first control process 404, an analysis process for analyzing the content of the command packet signal 402 and generates a roger signal indicating that the content of the command packet signal 402 has been understood. Further, the lens-side control unit 203 performs, as the first control process 404, the communication error check process as mentioned above by using the check sum data contained in the command packet signal 402. The roger signal generated in the first control process 404 is output to the camera body as a lens-side data packet signal 407. The lens-side control 203 performs, as the second control process 408, an analysis process for analyzing the content of the body-side data packet signal 406 and the communication error check process as mentioned above by using the check sum data contained in the body-side data packet signal 406.

When the second control process 408 is completed, the lens-side control unit 203 gives a notice of completion of the second control process 408 to the lens-side first communication unit 217. After this, the lens-side control unit 203 controls the lens-side first communication unit 217 to output a signal at an L level through the contact LP6. That is, the signal level of the signal line RDY is set to an L level (T5).

When the received body-side command packet signal 402 is an instruction to drive the lens-side driven member (for example, a focusing lens) as mentioned above, the lens-side control unit 203 controls the lens-side first communication unit 217 to set the signal level of the signal line RDY to an L level and controls the lens driving unit 212 to perform a process to drive the focus lens 210b by the amount of drive instructed.

Each communication performed in a period from time T1 to time T5 constitutes a command data communication at one time. As mentioned above, in the command data communication at one time, one body-side command packet signal 402 and one body side-data packet signal 406 are transmitted by the body-side control unit 103 and the body-side data packet signal 406, respectively. That is, although separately transmitted for the sake of convenience of processing, the two data, i.e., the body-side command packet signal 402 and the body-side data packet signal 406 constitute a single piece of control data.

Similarly, in the command data communication at one time, one lens-side command packet signal 403 and one lens-side data packet signal 407 are transmitted by the lens-side control unit 203 and the lens-side first communication unit 217, respectively. That is, the lens-side command packet signal 403 and the lens-side data packet signal 407 together constitute one piece of response data.

As mentioned above, the lens-side control unit 203 and the lens-side first communication unit 217 receive control data from the body-side first communication unit 117 and transmit response data to the body-side first communication unit 117 concurrently. The contacts LP6 and BP6 used in the command data communication are contacts, through which other asynchronous signals that are not synchronized with the clock signal (the signal level of the signal line RDY being H (High) level or L (low) level) are transmitted.

Explanation on Hot-line Transmission

The lens-side control unit 203 controls the lens-side second communication unit 218 to transmit lens position data to the body-side second communication unit 118 through the contacts LP7 to LP10, i.e., via the signal lines HREQ, HANS, HCLK, and HDAT. Hereafter, communication performed between the lens-side second communication unit 218 and the body-side second communication unit 118 is explained in detail.

In the present embodiment, the communication performed between the lens-side control unit 203 and the lens-side second communication unit 218 and the body-side control unit 103 and the body-side second communication unit 118 is referred to as "hot-line communication".

Figure 6A:
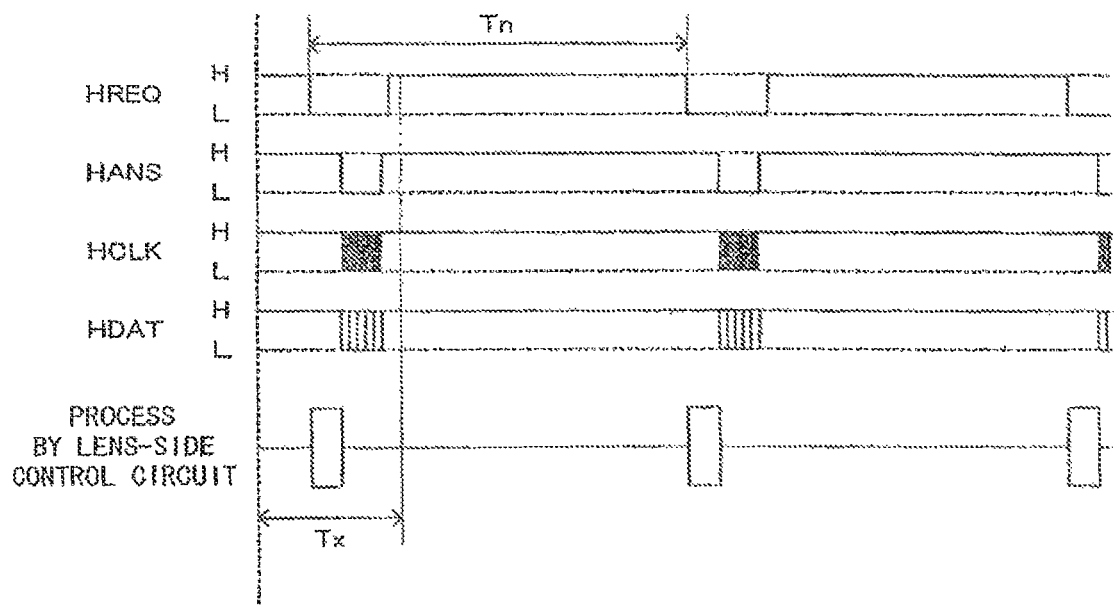
FIGS. 6A and 6B present timing charts illustrating examples of hot line communication.
Figure 6B:
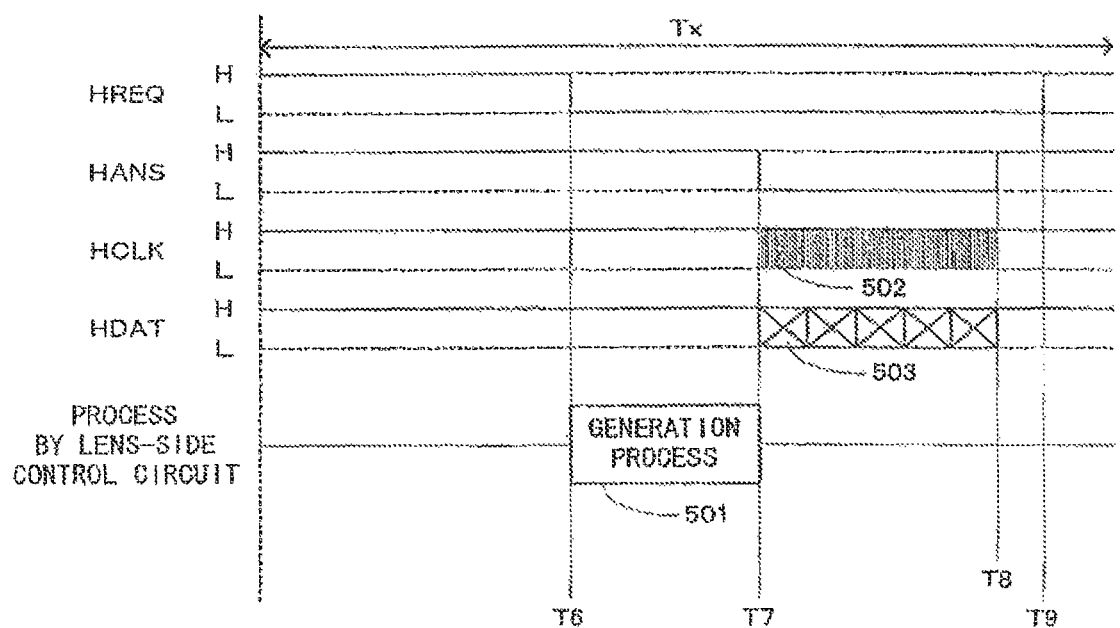

FIG. 6 presents a timing chart illustrating an example of hot-line communication. The body-side control unit 103 according to the present embodiment is configured such that hot-line communication is started for every second predetermined period (for example, 1 msec in the present embodiment). This period is shorter than the period in which the command data communication is performed. FIG. 6A presents a diagram illustrating a state in which hot-line communication is performed for every predetermined period Tn. FIG. 6B illustrates a state in which a time Tx required for one communication among repeatedly performed hot-line communications is shown in magnification. Hereafter, the procedure of hot-line communication is explained with reference to the timing chart shown in FIG. 6B.

The body-side control unit 103 and the body-side second communication unit 118 first output a signal at an L level through the contact BP7 at the time of start of the hot-line communication (T6). That is, the signal level of the signal line HREQ is set to an L level. The lens-side second communication unit 218 gives a notice indicating that the signal is input to the contact LP7 to the lens-side control unit 203. In response to this notice, the lens-side control unit 203 starts execution of a generation process 501 to generate lens position data. The generation process 501 is a process in which the lens-side control unit 203 controls a lens position detection unit 213 to detect the position of the focus lens 210b and generate lens position data that represents a result of the detection.

When the lens-side control unit 203 has completed execution of the generation process 501, the lens-side control unit 203 and the lens-side second communication unit 218 output a signal at an L level through the contact LP8 (T7). That is, the signal level of the signal line HANS is set to an L level. The body-side control unit 103 and the body-side second communication unit 118 output a clock signal 502 through the contact BP9 in response to the inputting of the signal in the contact BP8. That is, body-side control unit 103 and the body-side second communication unit 118 transmit the clock signal to the lens-side second communication unit 218 via the signal line HCLK.

The lens-side control unit 203 and the lens-side second communication unit 218 output a lens position data signal 503 through the contact LP10 in synchronization with the clock signal 502. That is, lens-side control unit 203 and the lens-side second communication unit 218 transmit the lens position data signal 503 to the body-side second communication unit 118 via the signal line HDAT.

When the transmission of the lens position data signal 503 is completed, the lens-side control unit 203 and the lens-side second communication unit 218 output a signal at an H level through the contact LP8. That is, the signal level of the signal line HANS is set to an H level (T8). The body-side second communication unit 118 outputs a signal at an H level through the contact LP7 in response to the inputting of the signal into the contact BP8. That is, the signal level of the signal line HREQ is set to an H level (T9).

The communications performed during a period from time T6 to time T9 constitute a hot-line communication at one time. As mentioned above, in the hot-line communication at one time, only one lens position data signal 503 is transmitted by the lens-side control unit 203 and the lens-side second communication unit 218. The contacts LP7, LP8, BP7, and BP8 that are used for the hot-line communication are other contacts through which asynchronous signals that are not synchronized with the clock signal are transmitted. That is, the contacts LP7 and BP7 are contacts through which asynchronous signal (the signal level of the signal line HREQ being H (High) level, or L (low) level) are transmitted. The contacts LP8 and BP8 are contacts through which asynchronous signal (the signal level of the signal line HANS being H (High) level, or L (low) level) are transmitted.

The command data communication and the hot-line communication can be performed either simultaneously or partially concurrently. That is, one of the lens-side first communication unit 217 and the lens-side second communication unit 218 can perform communication with the camera body 100 even when the other of them is performing communication with the camera body 100.

With the camera system according to the first embodiment as described above, the following advantageous effects can be obtained.

(1) At the holding unit 202 on the lens mount 201, there are arranged in a circular arc the contact LP3 through which the clock signals 401, 405 are transmitted from the camera body 100, the contact LP4 through which the body-side command packet signal 402 and the body-side data packet signal 406 are transmitted in synchronization with the clock signals 401, 405, the contact LP5 through which the lens-side command packet signal 403 and the lens-side data packet signal 407 are transmitted to the camera body 100 in synchronization with the clock signals 401, 405, and the contact LP6 through which asynchronous signals that are not synchronized with the clock signals 401, 405 are transmitted to the camera body 100. At the holding unit 202 on the lens mount 201, there are arranged in the direction of an extension of a circular arc the contact LP9 through which the clock signal 502 is transmitted from the camera body 100, the contact LP10 through which the lens position data signal 503 is transmitted to the camera body 100 in synchronization with the clock signal 502, the contact LP7 through which an asynchronous signal that is not synchronized with the clock signal 502 is transmitted from the camera body 100, and the contact LP8 through which an asynchronous signal that is not synchronized with the clock signal 502 is transmitted to the camera body 100. The lens-side first communication unit 217 receives control data from the camera body 100 and transmits response data to the camera body 100 through the contacts LP3 to LP6 concurrently. The lens-side second communication unit 218 transmits lens position data to the camera body 100 through the contacts LP7 to LP10. One of the lens-side first communication unit 217 and the lens-side second communication unit 218 can perform communication with the camera body 100 even when the other of them performs communication with the camera body 100. The contact LP6 is arranged at a position closer to the contacts LP7 to LP 10 than to the contacts LP3 to LP5. The contacts LP7 and LP8 are arranged at positions closer to the contacts LP3 to LP6 than the contacts LP9 and LP10 are. With this construction, influences of the communication by one of the two independent communication systems upon the communication by the other can be minimized.

(2) At the holding unit 202 on the lens mount 201, there are arranged the contact LP12 through which the driving voltage of the lens drive unit 212 is supplied from the camera body 100, and the contact LP11 which serves as a ground terminal corresponding to the drive voltage in a direction of extension in a circular arc. Here, the contacts LP7 to LP10 are arranged between the contacts LP3 to LP6 and the contacts LP10, LP11. The contact LP10 is arranged next to the contact LP11. With this construction, influences of the signal line BAT via which drive voltage of the driving unit 212 on the signal line via which hot-line communication is performed can be minimized.

(3) At the holding unit 202 on the lens mount 201, there are arranged the contact LP1 through which operation voltages for command data communication and hot-line communication (i.e., operation voltages for the lens-side first communication unit 217 and the lens-side second communication unit 218) are supplied from the camera body 100 and the contact LP2 that serves as a ground terminal corresponding to the operation voltages in a direction of extension of in a circular arc. Here, a difference between an upper limit and a lower limit of current that flows through the contact LP11 is greater than a difference between an upper limit and a lower limit of current that flows through the contact LP2. The contacts LP3 to LP6 are arranged between the contacts LP7 to LP10 and the contacts LP1, LP2. The contact LP2 is arranged at a position closer to the contacts LP3 to LP6 than the contact LP1 is. With this construction, influences of the signal line V33 on the signal line for command data communication can be minimized. Influences of a change in current that flows in the signal line PGND upon the signal line of the communication system can be minimized.

(4) The contact LP3 is arranged next to the contact LP2. The contact LP5 is arranged next to the contact LP6. The contact LP4 is arranged between the contacts LP3 and LP5. The contact LP7 is arranged next to the contact LP6. The contact LP8 is arranged next to the contact LP9. As a result, influences by noises that occur between the respective contacts can be minimized.

(5) At the holding unit 202 on the lens mount 201, there are arranged in the form of a circular arc twelve contacts: the contact LP12 through which drive voltage for operating the lens driving unit 212 is supplied from the camera body 100; the contact LP11 which is a ground terminal corresponding to the drive voltage; the contact LP3 through which the clock signals 401, 405 are transmitted from the camera body 100; the contact LP4 through which the body-side command packet signal 402 and the body-side data packet signal 406 are transmitted from the camera body 100 in synchronization with the clock signals 401, 405; the contact LP5 through which the lens-side command packet signal 403 and the lens-side data packet signal 407 are transmitted to the camera body 100 in synchronization with the clock signal 401, 405; the contact LP9 through which the clock signal 502 is transmitted from the camera body 100; the contact LP10 through which the lens position data signal 503 is transmitted to the camera body 100 in synchronization with the clock signal 502; the contact LP6 through which an asynchronous signal that is not synchronized with any of the clock signals 401, 405 and 502 is transmitted to the camera body 100; the contact LP7 through which an asynchronous signal that is not synchronized with any of the clock signals 401, 405 and 502 is transmitted from the camera body 100; the contact LP8 through which an asynchronous signal that is not synchronized with any of the clock signals 401, 405 and 502 is transmitted to the camera body 100; the contact LP1 through which operation voltages for the lens-side first communication unit 217 and the lens-side second communication unit 218 are supplied from the camera body 100; and the contact LP2 which is a ground terminal corresponding to the operation voltages. Here, the contact LP12 is arranged on one end of the sequence of the twelve contacts and the contact LP1 is on the other end of that sequence. The contact LP11 is arranged next to the contact LP12 and the contact LP2 is arranged next to the contact LP1. With this construction, influences on the communication system by noises from outside can be suppressed.

(6) The contacts LP3, LP4, LP5, and LP6 are arranged next to the contact LP2 in the form of a circular arc. The contacts LP7, LP8, LP9, and LP10 are arranged next to the contact LP11 in the form of a circular arc. With this construction, mutual influences between two independent communication lines can be minimized.

Modifications described below are within the scope of the present invention and one or more variations may be combined with the above-mentioned embodiment(s).

Variation 1

In the above-mentioned embodiments, a plurality of contacts is arranged in a single row along the edge of the mount as shown in FIGS. 4A and 4B. The plurality of contacts may be arranged in a single row in a form other than that shown in FIGS. 4A and 4B. For example, a plurality of contacts may be arranged in a straight line. The plurality of contacts may be arranged at any desired positions of the lens mount 101, 201. FIGS. 4A and 4B show the arrangement of the plurality of contacts on the lower part of the respective lens mounts 101 and 201. However, they may be arranged on the upper part of the lens mounts 101, 201 or on both sides of the lens mounts 101, 201.

Variation 2

In the above-mentioned embodiment, the position data of the focus lens 210b has been explained to be transmitted from the interchangeable lens 200 to the camera body 100 by hot-line communication. However, the system may be configured such that state information of a driven member other than the focus lens can be transmitted by hot-line communication. For example, when the interchangeable lens 200 is provided with an image blur correction lens, the position (X- and Y-position) of the image blur correction lens may be transmitted. Alternatively, the position of diaphragm in the interchangeable lens (information related to the diaphragm aperture size) may be transmitted. When the interchangeable lens is a zoom lens, information on focal length may be transmitted. In this case, the generation process 501 shown in FIG. 6B includes a process for the generation of data of the position of the image blur correction lens, a process for the generation of data of control position of the diaphragm that forms a diaphragm aperture (information on position corresponding to aperture size), and a process for the generation of the data of the position of the zoom lens.

Variation 3

In the above-mentioned embodiment, the holding unit 102 (on the body side) and the holding unit 202 (on the interchangeable lens side) are each formed as an integrated component (a single component). However, the holding units 102 and 202 may each be configured to include a plurality of holding unit components divided into several groups (corresponding to respective contacts) which can be combined to provide an integrated holding unit.

Variation 4

In the above-mentioned embodiment, separate communication interfaces are provided for two types of communications (i.e., hot-line communication and command data communication). However, these interfaces may be integrated into a single interface. That is, referring to the interchangeable lens, the lens-side first communication unit 217 and the lens-side second communication unit 218 may be configured as one integrated unit. Similarly, referring to the camera body, the body-side first communication unit 117 and the body-side second communication unit 118 may be configured as one integrated unit. Further, a body-side control unit and a lens-side control unit each having the function of such a communication interface may be used instead of the body-side control unit 103 and the lens-side control unit 203.

Variation 5

In the above-mentioned embodiment, the camera system including the camera body 100 and the interchangeable lens 200 has been described. However, the present invention is not limited to camera systems. The construction (the construction of the camera body) explained in the above-mentioned embodiment may be applied to any electronic device that includes a mount to which the interchangeable lens 200 can be detachably attached, is communicable with the interchangeable lens 200, and can supply power to the interchangeable lens 200. An example of such an electronic device is a projector. By configuring the projection lens component of a projector as a projection lens that can be detachably attached and interchangeable, a projector system similar to the above-mentioned embodiment can be obtained.

Variation 6

In the above-mentioned embodiment, explanation has been made on the image blur correction mechanism including an image blur correction lens that can move so as to have a motion vector containing a component in the direction perpendicular to the direction of optical axis of the imaging optical system 210 and can perform image blur correction by driving the image blur correction lens. However, the image blur correction mechanism is not limited to the above-mentioned one but may be one which performs image blur correction by rotating or swinging the image blur correction optical system in the pitching direction and the yawing direction of the camera system.

According to the above embodiments, an influence of the communication performed by one of two independent communication systems on the communication performed by the other of the communication systems can be minimized.

The present invention is not limited to the above-mentioned embodiment and various forms may be conceived within the technical concept of the present invention so far as the features of the present invention are not damaged. Such forms are also included within the scope of the present invention.

What is claimed is:

1. A camera body to which an interchangeable lens can be detachably attached, the camera body comprising:
   a first contact that sends camera data to the interchangeable lens using a first clock signal;
   a second contact that receives first lens data from the interchangeable lens using the first clock signal;
   a third contact that receives second lens data different from the first lens data from the interchangeable lens using a second clock signal different from the first clock signal; and
   a fourth contact that supplies to the interchangeable lens an operation voltage that is different from a drive voltage used for driving a lens, wherein
   the first and second contacts are arranged between the fourth contact and the third contact.

2. A camera body to which an interchangeable lens can be detachably attached, the camera body comprising:
   a first contact that sends camera data to the interchangeable lens using a first clock signal;
   a second contact that receives first lens data from the interchangeable lens using the first clock signal;
   a third contact that receives second lens data different from the first lens data from the interchangeable lens using a second clock signal different from the first clock signal;
   a fourth contact that supplies to the interchangeable lens an operation voltage that is different from a drive voltage used for driving a lens; and
   a fifth contact that is a ground terminal for the operation voltage, wherein
   the fifth contact is arranged between the fourth contact and the first, second, and third contacts.

3. A camera body to which an interchangeable lens can be detachably attached, the camera body comprising:
   a first contact that sends camera data to the interchangeable lens using a first clock signal;
   a second contact that receives first lens data from the interchangeable lens using the first clock signal;
   a third contact that receives second lens data different from the first lens data from the interchangeable lens using a second clock signal different from the first clock signal;
   a fourth contact that supplies to the interchangeable lens an operation voltage that is different from a drive voltage used for driving a lens; and a fifth contact that is a ground terminal for the operation voltage, wherein
the first and second contacts are arranged closer to the fifth contact than is the third contact, and
the first and second contacts are arranged closer to the fifth contact than they are to the fourth contact.

4. The camera body according to claim 1, further comprising:
a sixth contact that communicates the second clock signal, wherein
the sixth contact is arranged at a position closer to the fourth contact than is the third contact.

5. The camera body according to claim 1, further comprising:
a seventh contact that outputs the first clock signal to the interchangeable lens, wherein
the seventh contact is arranged at a position closer to the fourth contact than is the second contact.

6. The camera body according to claim 2, further comprising:
a sixth contact that communicates the second clock signal, wherein
the sixth contact is arranged at a position closer to the fourth contact than is the third contact.

7. The camera body according to claim 2, further comprising:
a seventh contact that outputs the first clock signal to the interchangeable lens, wherein
the seventh contact is arranged at a position closer to the fourth contact than is the second contact.

8. The camera body according to claim 3, further comprising:
a sixth contact that communicates the second clock signal, wherein
the sixth contact is arranged at a position closer to the fourth contact than is the third contact.

9. The camera body according to claim 3, further comprising:
a seventh contact that outputs the first clock signal to the interchangeable lens, wherein
the seventh contact is arranged at a position closer to the fourth contact than is the second contact.

10. The camera body according to claim 1, further comprising:
a fifth contact that is a ground terminal for the operation voltage.

11. The camera body according to claim 10, wherein
the operation voltage is used for sending the first lens data and the second lens data to the camera body.

12. The camera body according to claim 2, wherein
the operation voltage is used for sending the first lens data and the second lens data to the camera body.

13. The camera body according to claim 3, wherein
the operation voltage is used for sending the first lens data and the second lens data to the camera body.

14. A device configured to be detachably attached to a camera body, the device comprising:
a first contact that receives camera data sent from the camera body using a first clock signal;
a second contact that sends first device data to the camera body using the first clock signal;
a third contact that sends second device data different from the first device data to the camera body using a second clock signal different from the first clock signal; and
a fourth contact that supplies, from the camera body, an operation voltage to the device, the operation voltage being different from a drive voltage used for driving a lens, wherein
the first and second contacts are arranged between the fourth contact and the third contact.

15. A device configured to be detachably attached to a camera body, the device comprising:
a first contact that receives camera data sent from the camera body using a first clock signal;
a second contact that sends first device data to the camera body using the first clock signal;
a third contact that sends second device data different from the first device data to the camera body using a second clock signal different from the first clock signal;
a fourth contact that supplies, from the camera body, an operation voltage to the device, the operation voltage being different from a drive voltage used for driving a lens; and
a fifth contact that is a ground terminal for the operation voltage, wherein
the fifth contact is arranged between the fourth contact and the first, second and third contacts.

16. A device configured to be detachably attached to a camera body, the device comprising:
a first contact that receives camera data sent from the camera body using a first clock signal;
a second contact that sends first device data to the camera body using the first clock signal;
a third contact that sends second device data different from the first device data to the camera body using a second clock signal different from the first clock signal;
a fourth contact that supplies, from the camera body, an operation voltage to the device, the operation voltage being different from a drive voltage used for driving a lens; and
a fifth contact that is a ground terminal for the operation voltage, wherein
the first and second contacts are arranged closer to the fifth contact than is the third contact, and
the first and second contacts are arranged closer to the fifth contact than they are to the fourth contact.

17. The device according to claim 14, further comprising:
a sixth contact that communicates the second clock signal, wherein
the sixth contact is arranged at a position closer to the fourth contact than is the third contact.

18. The device according to claim 14, further comprising:
a seventh contact to which the first clock signal output from the camera body is configured to be input, wherein
the seventh contact is arranged at a position closer to the fourth contact than is the second contact.

19. The device according to claim 15, further comprising:
a sixth contact that communicates the second clock signal, wherein
the sixth contact is arranged at a position closer to the fourth contact than is the third contact.

20. The device according to claim 15, further comprising:
a seventh contact to which the first clock signal output from the camera body is configured to be input, wherein
the seventh contact is arranged at a position closer to the fourth contact than is the second contact.

21. The device according to claim 16, further comprising:
a sixth contact that communicates the second clock signal, wherein the sixth contact is arranged at a position closer to the fourth contact than is the third contact.

22. The device according to claim 16, further comprising:
a seventh contact to which the first clock signal output from the camera body is configured to be input, wherein
the seventh contact is arranged at a position closer to the fourth contact than is the second contact.

23. The device according to claim 14, further comprising:
a fifth contact that is a ground terminal for the operation voltage.

24. The device according to claim 23, wherein
the operation voltage is used for sending the first device data and the second device data to the camera body.

25. The device according to claim 15, wherein
the operation voltage is used for sending the first device data and the second device data to the camera body.

26. The device according to claim 16, wherein
the operation voltage is used for sending the first device data and the second device data to the camera body.

* * * * *